US012271694B1

(12) United States Patent
Somasundaran et al.

(10) Patent No.: US 12,271,694 B1
(45) Date of Patent: Apr. 8, 2025

(54) MACHINE LEARNING-BASED AUTOMATED NARRATIVE TEXT SCORING INCLUDING EMOTION ARC CHARACTERIZATION

(71) Applicant: Educational Testing Service, Princeton, NJ (US)

(72) Inventors: Swapna Somasundaran, Plainsboro, NJ (US); Xianyang Chen, Princeton, NJ (US); Michael Flor, Lawrence Township, NJ (US)

(73) Assignee: Educational Testing Service, Princeton, NJ (US)

( * ) Notice: Subject to any disclaimer, the term of this patent is extended or adjusted under 35 U.S.C. 154(b) by 251 days.

(21) Appl. No.: 17/238,368

(22) Filed: Apr. 23, 2021

Related U.S. Application Data (60) Provisional application No. 63/014,975, filed on Apr. 24, 2020.

(51) Int. Cl.
*G06F 40/284* (2020.01)
*G06F 40/30* (2020.01)
*G06N 20/00* (2019.01)

(52) U.S. Cl.
CPC .......... *G06F 40/284* (2020.01); *G06F 40/30* (2020.01); *G06N 20/00* (2019.01)

(58) Field of Classification Search
CPC ........ G06F 40/284; G06F 40/30; G06N 20/00
See application file for complete search history.

(56) References Cited

U.S. PATENT DOCUMENTS

| 10,311,454 | B2 * | 6/2019 | McCord | G06F 16/9535 |
|---|---|---|---|---|
| 11,507,609 | B1 * | 11/2022 | Warmsley | G06Q 50/01 |
| 2013/0297216 | A1 * | 11/2013 | Hirst | G16Z 99/00 702/19 |
| 2015/0356420 | A1 * | 12/2015 | Byron | G06N 7/00 706/12 |
| 2017/0277996 | A1 * | 9/2017 | Vogel | G06F 40/30 |
| 2019/0073351 | A1 * | 3/2019 | Zhang | G06N 3/084 |
| 2021/0248804 | A1 * | 8/2021 | Hussen Abdelaziz | G06T 13/80 |

OTHER PUBLICATIONS

Open Domain Event Extraction from Twitter, Ritter et al. 2012 (Year: 2012).*

(Continued)

*Primary Examiner* — Bhavesh M Mehta
*Assistant Examiner* — Darioush Agahi
(74) *Attorney, Agent, or Firm* — Jones Day (57) ABSTRACT

Quality of a narrative is characterized by receiving data that includes a narrative text. This narrative text is then tokenized and events are extracted from the tokenized words. The extraction can use, in parallel, two or more different extraction techniques. The extracted events are then extracted so that a waveform can be generated based on the aggregated extracted events that characterizes a plurality of emotional arcs within the narrative text. Subsequently, a plurality of waveform elements are extracted from the waveform. The narrative quality (or other quality) of the narrative text is then scored based on the extracted plurality of waveform elements and using a machine learning model trained to correlate emotional arc waveforms with narrative quality scores. Related apparatus, systems, techniques and articles are also described.

21 Claims, 4 Drawing Sheets

(56) References Cited

OTHER PUBLICATIONS

A Novel Method for Detecting Plot, Matthew Jockers, 2014 (Year: 2014).*
Can Sentiment Analysis Reveal Structure in a "Plotless" Novel? Elkins et al. 2019 (Year: 2019).*
Agarwal, Apoorv, Kotalwar, Anup, Rambow, Owen; Automatic Extraction of Social Networks from Literary Text: A Case Study on Alice in Wonderland; International Joint Conference on Natural Language Processing; Nagoya, Japan; pp. 1202-1208; Oct. 2013.
Alm, Cecilia Ovesdotter, Roth, Dan, Sproat, Richard; Emotions from Text: Machine Learning for Text-Based Emotion Prediction; Proceedings of Human Language Technology Conference and Conference on Empirical Methods in Natural Language Processing (HLT/EMNLP); Vancouver, Canada; pp. 579-586; Oct. 2005.
Alm, Cecilia Ovesdotter, Sproat, Richard; Emotional Sequencing and Development in Fairy Tales; International Conference on Affective Computing and Intelligent Interaction; pp. 668-674; 2005.
Bamman, David, Underwood, Ted, Smith, Noah; A Bayesian Mixed Effects Model of Literary Character; Proceedings of the 52nd Annual Meeting of the Association for Computational Linguistics; Baltimore, MD; pp. 370-379; Jun. 2014.
Berg-Kirkpatrick, Taylor, Burkett, David, Klein, Dan; An Empirical Investigation of Statisical Significance in NLP; Proceedings of the 2012 Joint Conference on Empirical Methods in Natural Language Processing and Computational Natural Language Learning; pp. 995-1005; 2012.
Bostan, Laura-Ana-Maria, Klinger, Roman; An Analysis of Annotated Corpora for Emotion Classification in Text; Proceedings of the 27th International Conference on Computational Linguistics; Santa FE, NM; pp. 2104-2119; Aug. 2018.
Celikyilmaz, Asli, Hakkani-Tur, Dilek, He, Hua, Kondrak, Greg, Barbosa, Denilson; The Actor-Topic Model for Extracting Social Networks in Literary Narrative; NIPS Workshop: Machine Learning for Social Computing; 2010.
Chaturvedi, Snigdha, Goldwasser, Dan, Daume, Hal; Ask, and Shall You Receive? Understanding Desire Fulfillment in Natural Language Text; Proceedings of the 30th AAAI Conference on Artificial Intelligence; pp. 2697-2703; 2016.
Chaturvedi, Snigdha, Srivastava, Shashank, Daume, Hal, Dyer, Chris; Modeling Evolving Relationships Between Characters in Literary Novels; Proceedings of the 30th AAAI Conference on Artificial Intelligence; pp. 2704-2710; 2016.
Chodorow, Martin, Burstein, Jill; Beyond Essay Length: Evaluating e-rater's Performance on TOEFL Essays; ETS Research Report, 73; Feb. 2004.
Choi, Yoonjung, Wiebe, Janyce; +/-EffectWordNet: Sense-Level Lexicon Acquisition for Opinion Inference; Proceedings of the 2014 Conference on Empirical Methods in Natural Language Processing (EMNLP); Doha, Qatar; pp. 1181-1191; Oct. 2014.
Chu, Eric, Roy, Deb; Audio-Visual Sentiment Analysis for Learning Emotional Arcs in Movies; IEEE International Conference on Data Mining; arXiv:1712.02896; pp. 829-834; Dec. 2017.
Del Vecchio, Marco, Kharlamov, Alexander, Parry, Glenn, Pogrebna, Ganna; The Data Science of Hollywood: Using Emotional Arcs of Movies to Drive Business Model Innovation in Entertainment Industries; arXiv:1807.02221; Jul. 2018.
Deng, Lingjia, Choi, Yoonjung, Wiebe, Janyce; Benefactive/Malefactive Event and Writer Attitude Annotation; Proceedings of the 51st Annual Meeting of the Association for Computational Linguistics; Sofia, Bulgaria; pp. 120-125; Aug. 2013.
Ding, Haibo, Riloff, Ellen; Acquiring Knowledge of Affective Events from Blogs Using Label Propagation; Proceedings of the 30th AAAI Conference on Artificial Intelligence; pp. 2935-2942; 2016.
Ding, Haibo, Riloff, Ellen; Weakly Supervised Induction of Affective Events by Optimizing Semantic Consistency; The 32nd AAAI Conference on Artificial Intelligence; pp. 5763-5770; 2018.
Efron, Bradley, Tibshirani, Robert; An Introduction to the Bootstrap; Chapman and Hall; 1993.
Elsner, Micha; Character-based Kernels for Novelistic Plot Structure; Proceedings of the 13th Conference of the Association for Computational Linguistics; Avignon, France; pp. 634-644; Apr. 2012.
Elson, David, Dames, Nicholas, McKeown, Kathleen; Extracting Social Networks from Literary Fiction; Proceedings of the 48th Annual Meeting of the Association for Computational Linguistics; Uppsala, Sweden; pp. 138-147; Jul. 2010.
Feng, Song, Kang, Jun Seok, Kuznetsova, Polina, Choi, Yejin; Connotation Lexicon: A Dash of Sentiment Beneath the Surface Meaning; Proceedings of the 51st Annual Meeting of the Association for Computational Linguistics; Sofia, Bulgaria; pp. 1774-1784; Aug. 2013.
Francisco, Virginia, Hervas, Raquel, Peinado, Federico, Gervas, Pablo; EmoTales: Creating a Corpus of Folk Tales with Emotional Annotations; Language Resources and Evaluation, 46(3); pp. 341-381; Sep. 2012.
Gao, Jianbo, Jockers, Matthew, Laudun, John, Tangherlini, Timothy; A Multiscale Theory for the Dynamical Evolution of Sentiment in Novels; International Conference on Behavior, Economic and Social Computing (BESC); pp. 1-4; 2016.
Goyal, Amit, Riloff, Ellen, Daume, Hal; Automatically Producing Plot Unit Representations for Narrative Text; Proceedings of the 2010 Conference on Empirical Methods in Natural Language Processing; 2010.
Goyal, Amit, Riloff, Ellen, Daume III, Hal, Gilbert, Nathan; Toward Plot Units: Automatic Affect State Analysis; Proceedings of the NAACL HLT 2010 Workshop on Computational Approaches to Analysis and Generation of Emotion in Text; Los Angeles, CA; pp. 17-25; Jun. 2010.
Iyyer, Mohit, Guha, Anupam, Chaturvedi, Snigdha, Boyd-Graber, Jordan, Daume III, Hal; Feuding Families and Former Friends: Unsupervised Learning for Dynamic Fictional Relationships; Proceedings of the NAACL-HLT 2016; San Diego, CA; pp. 1534-1544; Jun. 2016.
Jockers, Matthew; A Novel Method for Detecting Plot; https://www.matthewjockers.net/2014/06/05/a-novel-method-for-detecting-plot/; 2014.
Kim, Evgeny, Klinger, Roman; Who Feels What and Why? Annotation of a Literature Corpus with Semantic Roles of Emotions; Proceedings of the 27th International Conference on Computational Linguistics; Santa Fe, NM; pp. 1345-1359; Aug. 2018.
Kim, Evgeny, Klinger, Roman; Frowning Frodo, Wincing Leia, and a Seriously Great Friendship: Learning to Classify Emotional Relationships of Fictional Characters; Proceedings of NAACL-HLT; Minneapolis, MN; pp. 647-653; Jun. 2019.
Kim, Evgeny, Pado, Sebastian, Klinger, Roman; Investigating the Relationship Between Literary Genres and Emotional Plot Development; Proceedings of the Joint SIGHUM Workshop on Computational Linguistics for Cultural Heritage, Social Sciences, Humanities and Literature; Vancouver, BC, Canada; pp. 17-26; Aug. 2017.
Lehnert, Wendy; Plot Units and Narrative Summarization; Cognitive Science, 4; pp. 293-331; 1981.
Liu, Chen, Osama, Muhammad, de Andrade, Anderson; DENS: A Dataset for Multi-class Emotion Analysis; Proceedings of the 2019 Conference on Empirical Methods in Natural Language Processing and the 19th International Joint Conference on Natural Language Processing; Hong Kong, China; pp. 6293-6298; Nov. 2019.
McKee, Robert; Story: Substance, Structure, Style, and the Principles of Screenwriting; Harper-Collins Publishers; 1997.
Ouyang, Jessica, McKeown, Kathleen; Modeling Reportable Events as Turning Points in Narrative; Proceedings of the 2015 Conference on Empirical Methods in Natural Language Processing; Lisbon, Portugal; pp. 2149-2158; Sep. 2015.
Papalampidi, Pinelopi, Keller, Frank, Lapata, Mirella; Movie Plot Analysis via Turning Point Identification; Proceedings of the 2019 Conference on Empirical Methods in Natural Language Processing and the 9th International Joint Conference on Natural Language Processing; Hong Kong, China; pp. 1707-1717; Nov. 2019.
Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, (56) References Cited

OTHER PUBLICATIONS

Matthieu, Duchesnay, Edouard; Scikit-learn: Machine Learning in Python; Journal of Machine Learning Research, 12; pp. 2825-2830; 2011.

Plutchik, Robert; The Nature of Emotions; American Scientist, 89(4); pp. 344-350; Jul.-Aug. 2001.

Reagan, Andrew, Mitchell, Lewis, Kiley, Dilan, Danforth, Christopher, Sheridan Dodds, Peter; The Emotional Arcs of Stories are Dominated by Six Basic Shapes; EPJ Data Science, 5(1); 2016.

Somasundaran, Swapna, Flor, Michael, Chodorow, Martin, Molloy, Hillary, Gyawali, Binod, McCulla, Laura; Towards Evaluating Narrative Quality in Student Writing; Transactions of the Association for Computational Linguistics, 6; pp. 91-106; 2018.

Valls-Vargas, Josep, Zhu, Jichen, Ontanon, Santiago; Toward Automatic Role Identification in Unannotated Folk Tales; Proceedings of the 10th Annual AAAI Conference on Artificial Intelligence and Interactive Digital Entertainment, pp. 188-194; 2014.

Volkova, Ekaterina, Mohler, Betty, Meurers, Detmar, Gerdemann, Dale, Bulthoff, Heinrich; Emotional Perception of Fairy Tales: Achieving Agreement in Emotion Annotation of Text; Proceedings of the NAACL HLT 2010 Workshop on Computational Approaches to Analysis and Generation of Emotion in Text; Los Angeles, CA; pp. 98-106; Jun. 2010.

Wiebe, Janyce; Tracking Point of View in Narrative; Computational Linguistics, 20(2); pp. 233-287; 1994.

* cited by examiner

MACHINE LEARNING-BASED AUTOMATED NARRATIVE TEXT SCORING INCLUDING EMOTION ARC CHARACTERIZATION

RELATED APPLICATION

This application claims priority to U.S. Pat. App. Ser. No. 63/014,975 filed on Apr. 24, 2020, the contents of which are hereby fully incorporate by reference.

TECHNICAL FIELD

The subject matter described herein relates to advanced techniques for automatically identifying and characterizing emotion arcs within narrative text using machine learning and scoring the narrative text based, in part, on the automatically identifying and characterizing.

BACKGROUND

Story-telling is an important literacy skill. Children are taught to understand and write narratives in school, and literacy standards require students to write increasingly competent narratives. Emotion arcs form the foundations of story-telling and can be valuable in characterizing narrative text.

SUMMARY

In a first aspect directed to characterizing quality of a narrative, data is received that comprises a narrative text. This narrative text is then tokenized and events are extracted from the tokenized words. The extraction can use, in parallel, two or more different extraction techniques. The extracted events are then extracted so that a waveform can be generated based on the aggregated extracted events that characterizes a plurality of emotional arcs within the narrative text. Subsequently, a plurality of waveform elements are extracted from the waveform. The narrative quality (or other quality) of the narrative text is then scored based on the extracted plurality of waveform elements and using a machine learning model trained to correlate emotional arc waveforms with narrative quality scores.

A part-of-speech designation can be designated for each tokenized word. Such assigned part-of-speech designations for each tokenized word can be used to select which of the different extraction techniques is used to extract one or more events from such tokenized word.

The extraction techniques can be take various forms. For example, good-for/bad-for can be extracted from the tokenized words. In addition, the extraction techniques can extract affective events using polarity lexicon and/or extract sentiment connotation words from the tokenized words using a connotation lexicon.

The waveform can be generated by generating a valence-token offset plot with a sliding window using the aggregated elements. Such a waveform can be smoothing using one more smoothing techniques.

The waveform elements can include one or more of: a maximum peak value, a second maximum peak value, a local minimum value, a second local minimum value, a number of peaks, a number of valleys, a highest positive slope value, or a highest negative slope value.

The machine learning model can take various forms including a linear regression model with weights trained using a plurality of historical narrative texts having narrative quality scores.

The output of the scoring can be provided or consumed in different ways. For example, providing data characterizing the score can include one or more of: causing the data characterizing the scoring to be displayed in an electronic visual display, storing the data characterizing the scoring to be displayed in physical persistence, loading the data characterizing the scoring in memory, or transmitting the data characterizing the to a remote computing system over at least one network.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The current subject matter provides many technical advantages. For example, the current subject matter can advantageously provide automated and uniform feedback regarding narrative text including features which can be used by machine learning models to score or otherwise provide feedback.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to advanced, computer-based techniques for scoring or otherwise characterizing narrative text including the identification and characterization of emotion arcs within such text. The techniques utilize advanced machine learning and other techniques to more precisely and uniformly score texts.

While the current subject matter uses student narrative as an example, the current subject matter can be applied to a wide variety of narrative text/datasets. With the non-limiting examples provided herein, the annotated narrative dataset from Somasundaran et al. (Swapna Somasundaran, Michael Flor, Martin Chodorow, Hillary Molloy, Binod Gyawali, and Laura McCulla. 2018. Towards evaluating narrative quality in student writing. *Transactions of the Association for Computational Linguistics* 6:91-106.) was used. The data comprises of 942 narrative essays written by school students from the Criterion® program, an online writing evaluation service from Educational Testing Service. Criterion® program is a web-based, instructor-led writing tool that helps students plan, write and revise their essays. Narrative essays in this dataset belong to writers from three grade levels: grades 7, 10 and 12. Each essay is in response to one of 18 story-telling prompts; prompts belong to topics related to personal experiences, hypothetical situations, and fictional stories. Given below are example prompts:

[Personal Experience] There are moments in everyone's lives when they feel pride and accomplishment after completing a challenging task. These moments can happen in the classroom, on the field, or in their personal lives. Write a story about one of your proudest moments.

[Hypothetical Situation] Pretend that one morning you wake up and find out that you've become your teacher for a day! What happened? What do you do? Do you learn anything? Write a story about what happens. Use your imagination!

[Fictional Story] While some well-loved films feature sequels, many do not. These movies can leave the audience wanting to know more about the plot and characters they've enjoyed. Is there a film you've wanted to continue past the ending? Write a synopsis of your own "sequel" to a beloved movie using the same characters and settings as the real film. Remember to include a summary of the previous title and plot, as well as specific new details to draw the reader into your continuation of the movie.

The average essay length in the Somasundaran dataset is 320 words, with a range of 3 to 1310 words and a standard deviation of 195. The rubric used for scoring the essays was created by education experts and teachers. It defines a separate score (0-4) each for essay organization and essay development. The dataset also provides a *Narrative Score* for each essay, which is the sum of the organization and development scores. The score is an integer value from 0 to 8, with 8 corresponding to perfect organization and development of the narrative. The human inter-annotator agreement for the narrative quality score is 0.76 QWK.

Emotion Arc. An emotion arc involves the plotting or tracking of sentiment valence of some form along the time axis. However, it was observed that sentiment words and phrases occurring in narratives serve different purposes, such as describing character and settings, embellishing the story, advancing the plot, etc. For example, sentiment words may be used to describe a scene (e.g. "beautiful house"), a character (e.g. "smart girl"), a character's private state (e.g. "Peter thought that was foolish") or emotions (e.g. "Sally was furious").

The current subject matter is primarily directed to sentiments and emotions as they relate to the plot with the focus being mainly on events and implicit sentiments. Events are the core building blocks of narratives, and positive and negative events are closely tied to plot progression. This intuition is in line with previous work on plot units, which also focuses on positive/negative events (called events that please, and events that displease). Additionally, much of the plot movement is brought about by elements that have implicit sentiment value. For example, if "A kills B" in a story, it indicates an objective event on the surface, but denotes a conflict (or resolution, depending on whether B is an antagonist) in the story. Given this focus, the current emotion arcs can be constructed based on the following phenomena that have been previously developed for other purposes in computational linguistics.

Good-for and bad-for events: Good-for and Bad-for events, also known as benefactive and malefactive events, positively/negatively affect the entities on which they act. These events indicate someone (or something) doing something that affects someone (or something) in a positive or negative manner. In the context of stories, it is hypothesized that such events can indicate elements of a plot, such as conflict, resolution and goal achievement.

Affective events: These are events that affect an experience in positive or negative ways even though they do not, in their surface form, hold a valence. The events are implicitly affective based on the human knowledge of the event itself, such as going on a vacation or breaking a record.

Sentiment Connotation: These are words that imply a positive or negative sentiment even though they appear objective on the surface. For example, a gun-shot invariably indicates a conflict in the plot, even though it is objective on the surface.

Constructing Emotion. In order to construct the emotion arcs, various elements of interest can be extracted. As an example, good-for/bad-for events can be extracted, event polarity lexicon can be used for extracting affective events, and a connotation lexicon can be used for extracting sentiment connotation words. Once the elements are extracted for each sentence, they are aggregated to obtain a valence-token offset plot with a sliding window. This process is detailed below:

Preprocessing. For a given narrative text (e.g., student essay, etc.), the tokenization, part-of-speech tags and dependency parse of each sentence can be obtained using a tool such as ZPar. Then, the words can be lemmatized suing a tool such as PYTHON NLTK.

Good-for/Bad-for Event extraction. The EffectWordnet lexicon is a subset of WordNet, with an extra effect polarity annotation for every synset. The effects are either positive, negative or neutral. All the verbs can be picked out by POS tags and stopwords can be excluded. Then for each verb, its synset(s) can be looked up in WordNet, and if the synsets are covered in EffectWordnet, the corresponding effect polarity can be looked up. One verb can have multiple senses, and thus multiple synsets in WordNet, with potentially contradicting effect polarities. In some variations, a majority voting approach can be undertaken. For example, if a verb has 3 positive senses, 1 negative sense and 2 neutral senses, the verb can be treated as having a positive effect.

Affective Event Extraction. The affective event lexicon is a mapping from event templates to their polarities. An event template is a verb frame, with optional subject/object/prepositional phrase contexts. For example, (a) (a, love, (a my (a partner. Verbs can be picked out from the sentences by their POS tag, then the verbs subject/object can be found by dependency parse, and the verb can be matched with the lexicon.

Sentiment Connotation Extraction. The connotation lexicon is a mapping from verbs/nouns/adjectives to their connotation polarities. All tokens can be traversed therethrough with relevant POS tag, lemmatized and their connotation polarity can be looked up from the lexicon.

Arc Generation. After the above extraction steps, every token can be associated with a set of extracted polarities. Each token can be quantified by the following rules: a positive polarity equals +1, a negative polarity equals −1, and a neutral polarity equals 0. The score of a token is the sum of all its associated polarities from different sources. If a token has no associated polarity, its score is 0. Once the sentiment score for each token is determined, a sliding window can be used to slide over the whole narrative, moving by one token at a time, and scores within the window can be aggregated. The scores can be weighted with Gaussian distribution, with the center of the sliding window being the mean of distribution, and ¼ of window size as standard derivation. A fixed window size of 50 can be used and essays shorter than that can be dropped (25 out of 942 total essays). The aggregated scores can be plotted against the sliding window position, and they can be smoothed with the Savitsky-Golay filter to fit a smooth curve over the narrative.

Figure 1:
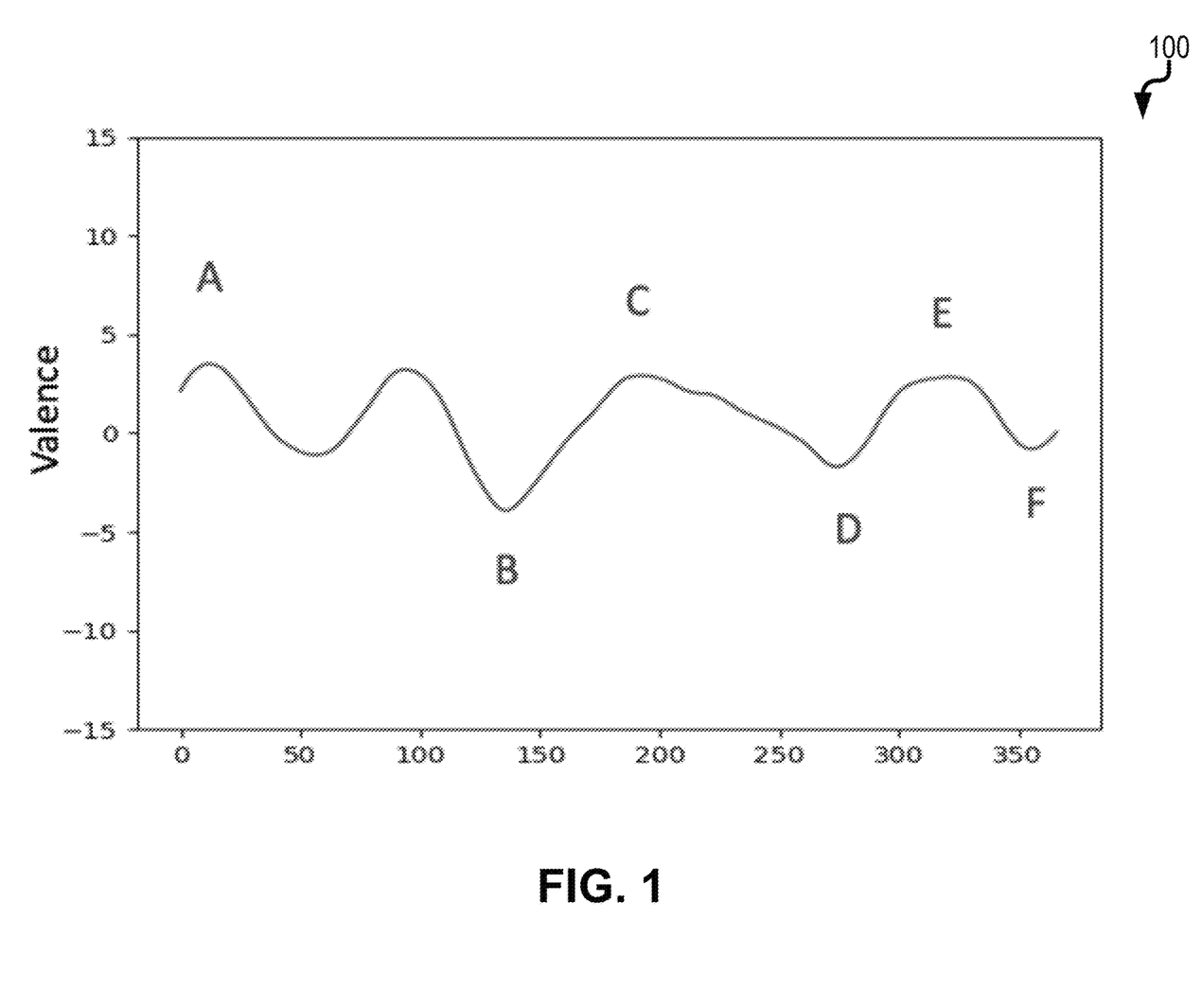
FIG. 1 is a diagram illustrating an emotion arc for a narrative on Proudest Moment in which the Y-axis represents positive/negative valence while the story time-line is along the X-axis.

Emotion Areas in Student Narratives. FIG. 1 is a diagram 100 that shows the emotion arc constructed for a first person narrative describing The Proudest Moment (an essay written in response to the prompt "Write a story about one of your proudest moments."). In this narrative, the writer talks about her tryout for a marching band performance. The narrator begins with a statement that qualifying for the marching band was her proudest moment. She describes "flagline", the marching band ("Flagline is a group of 10 to 30 girls and they perform in costumes that show school colors."). This story setup and the writer's aspiration is seen in the region (A) of FIG. 1. The narrator then goes on to describe how her friends and family thought she could not do it ("My family and friends didn't take me seriously.") and how that created self-doubt ("I started doubting myself."). This conflict in the plot is evidenced as a dip into negative valence in region (B) in the figure. Then she went to her grandmother for advice ("She gave me the best advice.", " . . . god will always answer your prayers). This is evidenced in part (C) where the emotion arc peaks on the positive side of the graph. When the narrator finally goes to the tryout, she is extremely nervous ("It felt like my knees were going to fall off", "It felt like I was going to faint."). Corresponding to this suspense in the plot, the arc dips again at (D). Finally her name gets called by the judges, and she is extremely elated (" . . . hugging everyone around me", "It was the proudest day of my life."). This happy resolution is corroborated by the arc at region (E). The narrative concludes with a reflective note that she remembers this day later on in life when she faces a tough situation (F).

Figure 2:
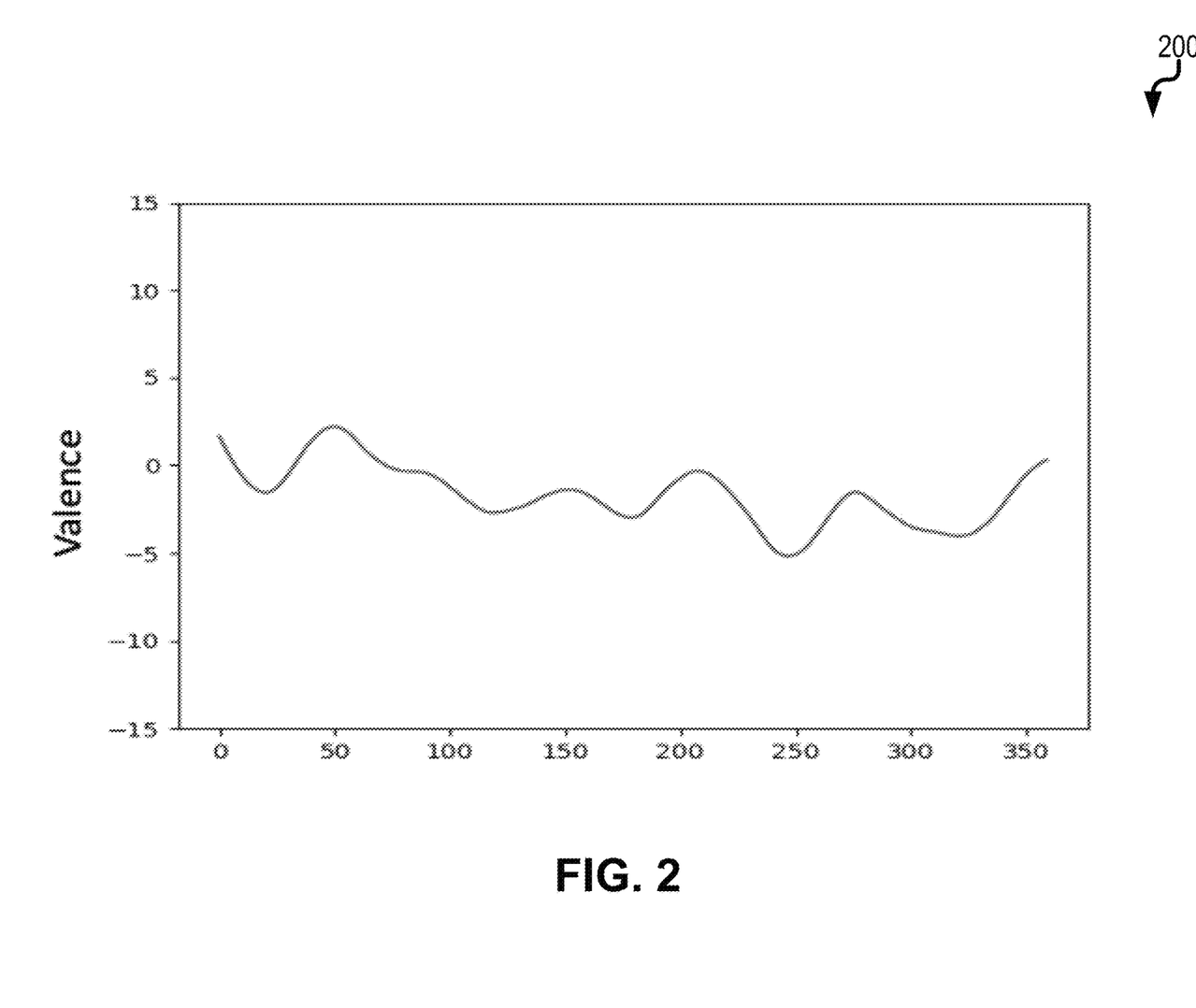
FIG. 2 is a diagram illustrating an emotion arc for a narrative on Movie Sequel in which the Y-axis represents positive/negative valence while the story time-line is along the X-axis.

FIG. 2 is a diagram 200 that shows the emotion arc for a third person fictional narrative. This essay was written in response to the prompt *Write a synopsis of your own "sequel" to a beloved movie using the same characters and settings as the real film*. The student chose to write a sequel to the movie "The Grey" starring Liam Neeson. Similar to the original movie, the sequel too is a survival thriller and follows Ottway, the character from the original. The story is full of adversities, such as vicious wolves, harsh climate of the Alaskan wilderness and starvation. The emotion arc correspondingly, remains in the negative valence area, with the small wave-like fluctuations to the neutral (relatively less negative) side for small victories. Towards the end of the climax, the protagonist is critically wounded. In the last sentence, the narrative says that a rescue team is coming his way, indicating a positive ending.

It was observed that short narrative essays written by school students show variations in the emotion arc corresponding to elements of a plot such as setting, conflict, suspense, resolution and reflection. Overall, emotion arcs vary across narrative genres, topics, and even within a topic due to creative variety. Nevertheless, the basic elements of a good story can still be found across all narrative types. For example, a plot almost always requires an emotional variation and an effective narrative will have some form of conflict or dip in emotional valence.

Relationship to Narrative Quality. It was seen above that well-written student narratives generally tend to have emotion arcs corresponding to plot elements. The next question is whether these elements can be indicators of narrative quality score as defined by standardized essay scoring rubrics. In order to answer this, the relationship of narrative quality scores to properties of the emotion arcs can be studied. Note that the narrative quality score is a function of a number of factors, such as organization of the story, effective use of transitioning, clear opening and closing, vivid description, character development, use of dialog, event sequencing, effective use of figurative language and other narrative techniques. Hence, one can expect presence of plot element in a story to be just a component that would contribute to the determination of the score.

While individual creativity makes it difficult to directly equate emotion arcs to scores, features can be extracted that represent arc characteristics including the following exemplary features. As used herein, the arc value at position i can be denoted as $d(i)$. Local maximum can be defined as positions where $d(i-1)<d(i)>d(i+1)$, and local minimum can be defined as points where $d(i-1)>d(i)<d(i+1)$. The slope at each point can be calculated as $d(i)-d(i-1)$.

1. Max Peak: The "peaks" in the arc can be found by looking for local maximums. The maximum among the local maximums can be chosen as Max Peak.
2. Second Max Peak: Similar to Max Peak, but the second greatest one of the local maximums.
3. Min Valley: The minimum of local minimums.
4. Second Min Valley: The second least local minimum.
5. Number of Peaks: Number of identified local maximums.
6. Number of Valleys: Number of identified local minimums.
7. Positive Slope: The slope where the arc is most steep and going upward, i.e. maxi $d(i)-d(i-1)$.
8. Negative slope: The slope where the arc is most steep and going downward, i.e. mini $d(i)-d(i-1)$.

The plots generated by sliding windows are noisy and contain lots of spurious local maximums/minimums. A Savitsky-Golay filter can be applied to smooth the high-frequency variations in the plots, as fine-grained perturbations are not as important as how valence emerges or drops in at a coarser granularity.

The maximum peak and minimum valley capture the height of happiness and depth of despair in the story. The second max peak (and min valley) capture the second highest points. Presumably, narratives with non-trivial storylines will show multiple significant peaks and valleys. The number of peaks and valleys try to capture the emotional variance in the story. The positive and negative slopes try to capture the emotional pace of the story.

Correlation with Narrative Quality. Using the scored essays, correlation (Pearson's r) can be computed for each of our features to the narrative quality score. It has previously been determined that essay length is strongly correlated with its score. Thus, for each of our features, correlation can be calculated with score after accounting for length, in order to see its effect on the narrative quality independent of essay length.

TABLE 1

Correlation (Pearson's r) of each feature with score.

| Feature | Pearson's r | r After controlling length |
|---|---|---|
| Max Peak | 0.151 | 0.006 |
| Second Max Peak | 0.184 | -0.003 |
| Positive Slope | 0.307 | 0.155 |
| Negative Slope | 0.312 | 0.136 |
| Min Valley | 0.412 | 0.202 |
| Second Min Valley | 0.431 | 0.193 |
| Num of Peaks | 0.538 | -0.016 |
| Num of Valleys | 0.541 | -0.011 |

Table 1 presents the Pearson's correlation r (sorted in ascending order) and partial correlation with narrative score. It is observed that the number of peaks and valleys are strongly correlated with score—having more peaks and valleys is related to higher the score. However, such stories are also relatively longer, and hence correlation drops dramatically when the length factor is removed. The slope-based features (Positive Slope and Negative Slope) show moderate correlation with score. The features related to negative dips in the story (Min Valley and Second Min Valley) show moderately strong correlation with score, and have a relatively smaller drop after accounting for length. This indicates that elements corresponding to strong adversities are effective narrative techniques even in short stories.

Narrative Quality Prediction. The next question explored is if and by how much the emotion arc features, individually or as a group, are useful for predicting narrative quality. The focus in this respect is on how much the emotion arc features can help to improve a system based on previous narrative features. Building on Somasundaran et al., 2018), a linear regression model was built with 10-fold cross-validation. Trimming of the predicted output was performed; that is, if the predicted score was above the max score (8), or below the min score (0), it was assigned the max or the min score, respectively. Bootstrapping experiments were performed to test for statistical significance in which 10,000 bootstrap samples were used.

The system using the best narrative features comprises the following features: Details+Modal+Pronoun+Content+Graph+Statives+Subjectivity+Transition+Quote. Prediction models were built by (1) adding one emotion arc-based feature at a time to the baseline (2) adding all of our features to baseline.

TABLE 2

Performance of the system when new features are added to the baseline.

| Feature | QWK |
|---|---|
| Baseline | 0.656 |
| +Negative Slope | 0.652 |
| +Max Peak | 0.657 |
| +Second Max Peak | 0.657 |
| +Number of Valleys | 0.661 |
| +Second Min Valley | 0.663 |

TABLE 2-continued

Performance of the system when new features are added to the baseline.

| Feature | QWK |
|---|---|
| +Number of Peaks | 0.666 * |
| +Positive Slope | 0.667 ** |
| +Min Valley | 0.669 ** |
| +All | 0.668 |

* indicates $p < 0.1$;
** = $p < 0.05$

Table 2 reports the performance of the resulting systems sorted in ascending order (for individual feature additions). Features corresponding to the positive emotional peaks in the story (Max Peak and Second Max Peak) add only minor improvements. Features corresponding to negative valence (Min Valley, Second Min Valley) help to improve the performance, indicating that detecting negative dips can improve the reliability of scoring. With respect to pacing, moving from a negative point to a positive point (Positive slope) seems to be indicative of narrative quality. However, adding all features together seems to produce no improvement indicating that while some individual features show promise, others tend to bring the performance down.

A detailed ablation study was performed (8 features resulted to 256 experiments) to find the subset of features that can be used together. The resulting feature combination that gave the best performance was [Max Peak+Min Valley+Second Max Peak+Number of Peaks+Positive Slope] and had a QWK value of 0.676.

Correlation with Other Sentiment Features. Somasundaran et al. (2018) explored subjectivity-based features for predicting narrative score. Their motivation was to capture evaluative and subjective language that is used to describe characters, situations, and characters' private states. While the current features are also sentiment-based, the emotion arc-based features capture a different dimension of the narrative and are complementary in nature.

Such a conclusion was experimentally confirmed by comparing the current features with the following subjectivity-based features in the baseline system: count of MPQA polar words (CMP), count of MPQA neutral words (CMN), presence of MPQA neutral words (PMN), presence of MPQA polar words (PMP), count of ASSESS polar words (CAP), count of unique ASSESS polar words (UAP).

TABLE 3

Correlation (Pearson's r) of each feature with previously explored subjectivity features: count of MPQA polar words (CMP), count of MPQA neutral words (CMN), presence of MPQA neutral words (PMN), presence of MPQA polar words (PMP), count of ASSESS polar words (CAP), count of unique ASSESS polar words (UAP)

| Emotion arc feature | CMP | CMN | PMN | PMP | CAP | UAP |
|---|---|---|---|---|---|---|
| Max Peak | 0.34 | 0.19 | 0.07 | 0.05 | 0.33 | 0.34 |
| Second Max Peak | 0.40 | 0.23 | 0.06 | 0.03 | 0.39 | 0.40 |
| Min Valley | 0.38 | 0.31 | 0.13 | 0.00 | 0.41 | 0.43 |
| Second Min Valley | 0.43 | 0.35 | 0.08 | 0.00 | 0.46 | 0.47 |
| Num of peaks | 0.73 | 0.61 | 0.19 | 0.04 | 0.78 | 0.73 |
| Num of Valleys | 0.73 | 0.60 | 0.19 | 0.05 | 0.78 | 0.73 |
| Positive Slope | 0.38 | 0.23 | 0.14 | 0.08 | 0.39 | 0.42 |
| Negative Slope | 0.42 | 0.27 | 0.12 | 0.10 | 0.41 | 0.45 |

Table 3 presents the Pearson's correlation r between our features and subjectivity features from the baseline system. Values of r greater than 0.5 are shown in bold.

As expected, there is strong correlation between the emotion arc features and subjectivity/sentiment. It is believed that this relationship is because (1) there are events that are also clearly sentiment-bearing words (e.g., "failing"), (2) good/bad events and feeling about them would co-occur in the story. For example, if something adverse happens to a character, he might feel bad about it. (3) It is very likely that there is overlap between the lexical resources used for constructing emotion arcs and the subjectivity/sentiment features.

However, the correlation values also indicate that there is some separation between our plot-motivated features and the subjectivity features—except for the high correlation between count-based subjectivity features and number-based arc features (all of which also correlate with length), the rest have r<0.5.

Figure 3:
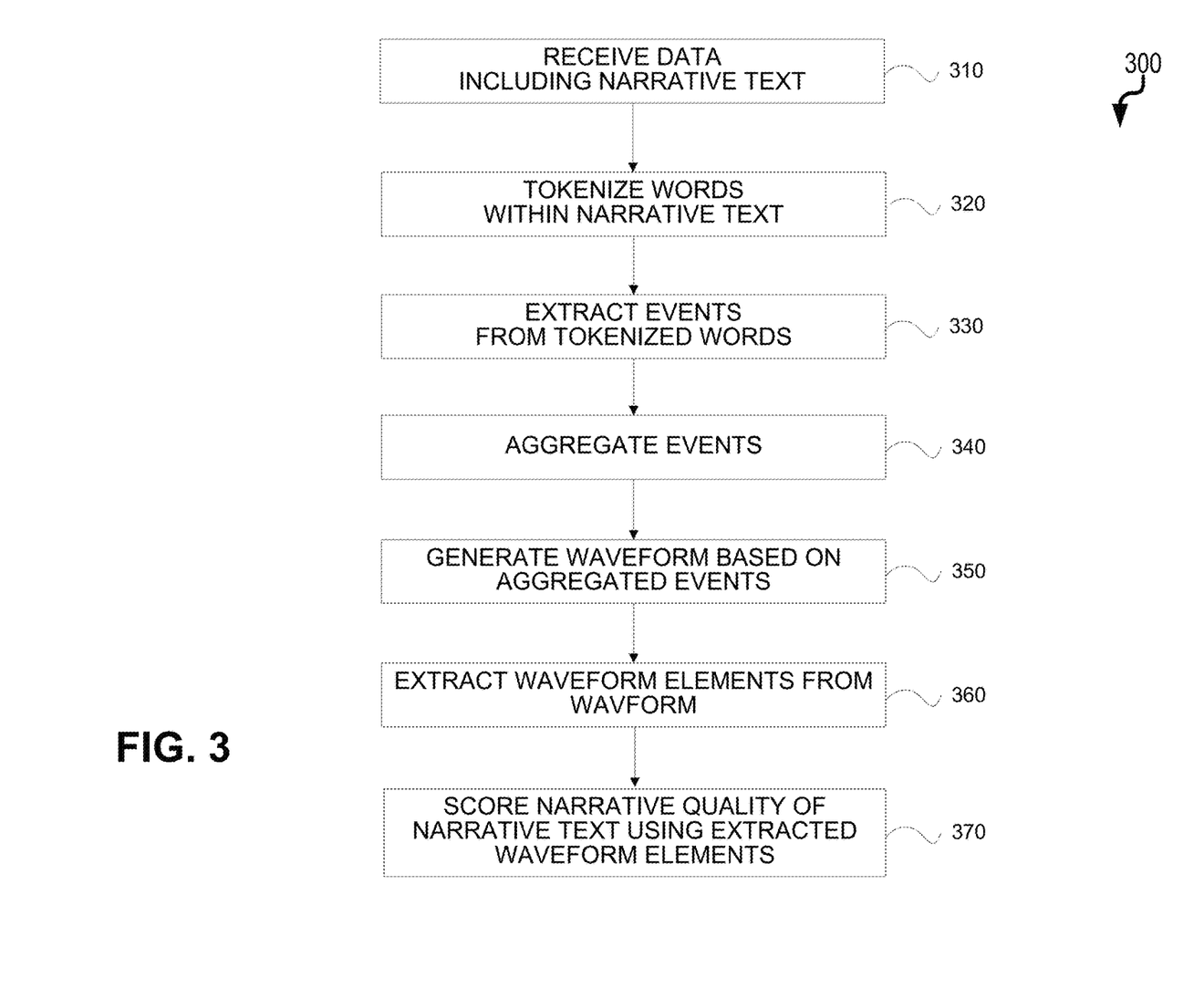
FIG. 3 is a process flow diagram illustrating machine learning-based automated narrative text scoring including emotion arc characterization.

FIG. 3 is a process flow diagram 300 for characterizing quality of a narrative in which, at 310, data is received that comprises a narrative text. Thereafter, at 320, words in the text are tokenized. Subsequently, at 330, a plurality of events from the tokenized words. In some variations, the extracting uses a plurality of different extraction techniques. Later, at 340, the extracted events are aggregated so that, at 350, a waveform is generated based on the aggregated extracted events that characterizes a plurality of emotional arcs within the narrative text. In addition, at 360, a plurality of waveform elements are extracted from the waveform. These elements can be consumed by various models including a machine learning model in order to provide an assessment/characterization of the narrative text. For example, at 370, narrative quality of the narrative text is scored based on the extracted plurality of waveform elements using a machine learning model that is trained to correlate emotional arc waveforms with narrative quality scores.

Figure 4:
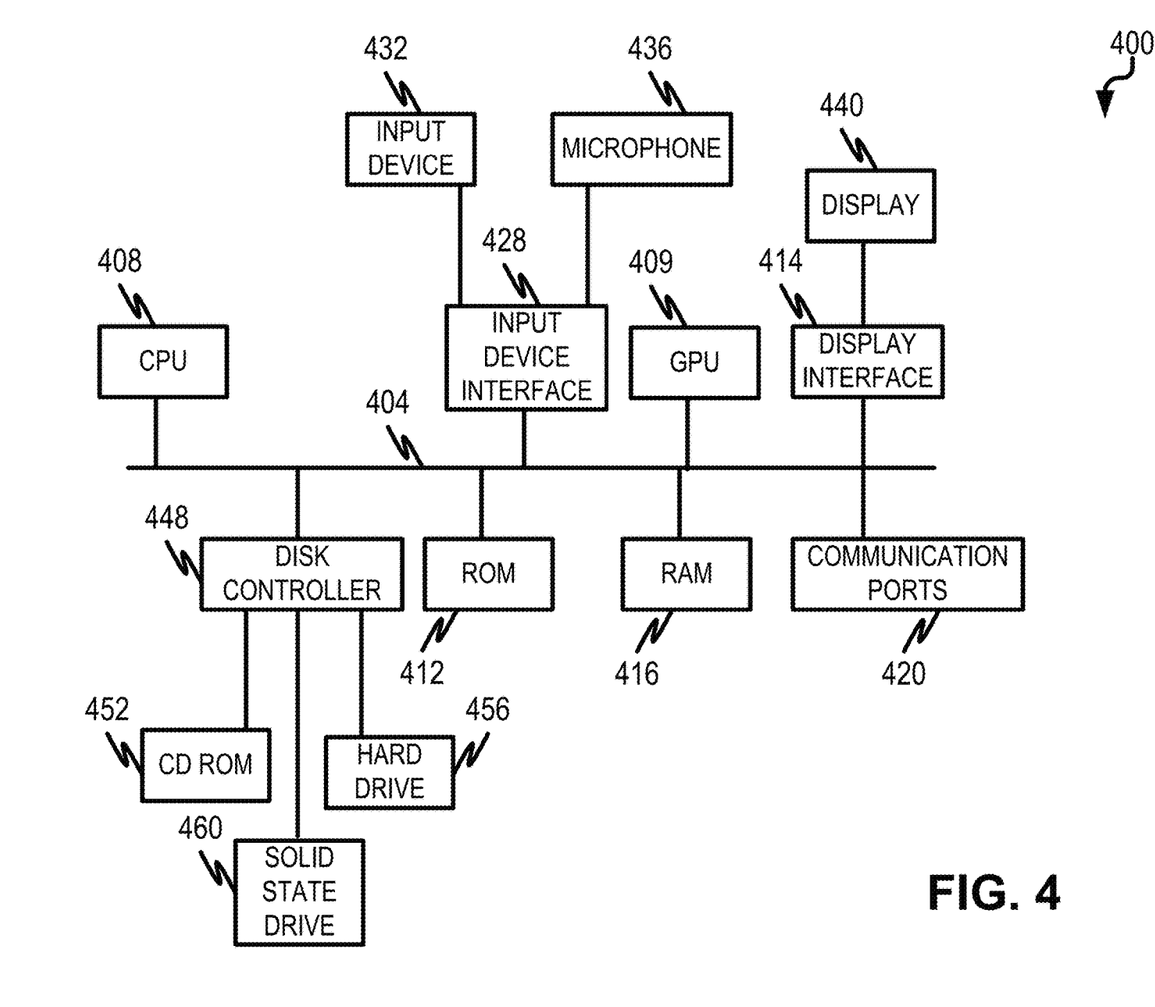
FIG. 4 is a diagram illustrating a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for characterizing quality of a narrative comprising:
   receiving data comprising a narrative text;
   determining that the narrative text meets a minimum length threshold;
   preprocessing words within the narrative text, wherein the preprocessing comprises:
   tokenizing the words;
   tagging part-of-speech of the words; and
   dependency parsing the words;
   extracting a plurality of events from the preprocessed words, the extracting a plurality of events using, in parallel, two or more different extraction techniques;
   aggregating the extracted events;
   generating a waveform based on the aggregated extracted events that characterizes a plurality of emotional arcs within the narrative text;
   extracting a plurality of waveform elements from the waveform, wherein the waveform elements comprise a maximum peak value, a number of peaks, and a highest positive slope value; and
   scoring a narrative quality of the narrative text based on the extracted plurality of waveform elements and using a machine learning model trained to correlate emotional arc waveforms with narrative quality scores.

2. The method of claim 1 further comprising:
   assigning a part-of-speech designation for each tokenized word.

3. The method of claim 2, wherein the assigned part-of-speech designation of each tokenized word is used to select which of the different extraction techniques is used to extract one or more events from such tokenized word.

4. The method of claim 3, wherein one of the two or more different extraction techniques comprises:
   extracting good-for/bad-for from the tokenized words.

5. The method of claim 1, wherein one of the two or more different extraction techniques comprises:
   extracting affective events using polarity lexicon.

6. The method of claim 1, wherein one of the two or more different extraction techniques comprises:
   extracting sentiment connotation words from the tokenized words using a connotation lexicon.

7. The method of claim 1, wherein the generating the waveform comprises:
   generating a valence-token offset plot with a sliding window using aggregated elements.

8. The method of claim 7, wherein the generating the waveform further comprises:
   smoothing the waveform using one or more smoothing techniques.

9. The method of claim 1, wherein the waveform elements comprise one or more of: a second maximum peak value, a local minimum value, a second local minimum value, a number of valleys, or a highest negative slope value.

10. The method of claim 1, wherein the machine learning model is a linear regression model with weights trained using a plurality of historical narrative texts having narrative quality scores.

11. The method of claim 1 further comprising: providing data characterizing the narrative quality scoring.

12. The method of claim 11, wherein the providing data characterizing the narrative quality scoring comprises one or more of: causing the data characterizing the narrative quality scoring to be displayed in an electronic visual display, storing the data characterizing the narrative quality scoring to be displayed in physical persistence, loading the data characterizing the narrative quality scoring in memory, or transmitting the data characterizing the narrative quality scoring to a remote computing system over at least one network.

13. The method of claim 1, wherein the preprocessing further comprises: lemmatizing the words.

14. A system for characterizing quality of a narrative comprising: at least one data processor; and memory storing instructions which, when executed by the at least one data processor, result in operations comprising:
   receiving data comprising a narrative text;
   determining that the narrative text meets a minimum length threshold;
   preprocessing words within the narrative text, wherein the preprocessing comprises:
   tokenizing the words;
   tagging part-of-speech of the words; and
   dependency parsing the words;
   extracting a plurality of events from the preprocessed words, the extracting a plurality of events using, in parallel, two or more different extraction techniques;
   aggregating the extracted events;
   generating a waveform based on the aggregated extracted events that characterizes a plurality of emotional arcs within the narrative text;
   extracting a plurality of waveform elements from the waveform, wherein the waveform elements comprise a maximum peak value, a number of peaks, and a highest positive slope value; and
   scoring a narrative quality of the narrative text based on the extracted plurality of waveform elements and using a machine learning model trained to correlate emotional arc waveforms with narrative quality scores.

15. The system of claim 14 further comprising:
assigning a part-of-speech designation for each tokenized word.

16. The system of claim 15, wherein the assigned part-of-speech designation of each tokenized word is used to select which of the different extraction techniques is used to extract one or more events from such tokenized word.

17. The system of claim 16, wherein the two or more of the different extraction techniques comprise: extracting good-for/bad-for from the tokenized words; extracting affective events using polarity lexicon; or extracting sentiment connotation words from the tokenized words using a connotation lexicon.

18. The system of claim 14, wherein the generating the waveform comprises:
generating a valence-token offset plot with a sliding window using aggregated elements.

19. The system of claim 14, wherein the generating the waveform further comprises:
smoothing the waveform using one or more smoothing techniques.

20. The system of claim 14, wherein the waveform elements comprise one or more of: a second maximum peak value, a local minimum value, a second local minimum value, a number of valleys, or a highest negative slope value.

21. The system of claim 14, wherein the machine learning model is a linear regression model with weights trained using a plurality of historical narrative texts having narrative quality scores.

* * * * *